United States Patent
Yang et al.

(10) Patent No.: US 11,277,852 B2
(45) Date of Patent: Mar. 15, 2022

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Ning Yang, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 94 days.

(21) Appl. No.: 16/754,711

(22) PCT Filed: Oct. 13, 2017

(86) PCT No.: PCT/CN2017/106097
§ 371 (c)(1),
(2) Date: Apr. 8, 2020

(87) PCT Pub. No.: WO2019/071580
PCT Pub. Date: Apr. 18, 2019

(65) Prior Publication Data
US 2020/0252950 A1    Aug. 6, 2020

(51) Int. Cl.
*H04W 72/12*    (2009.01)
*H04L 5/00*    (2006.01)
(52) U.S. Cl.
CPC ....... *H04W 72/1226* (2013.01); *H04L 5/0053* (2013.01)
(58) Field of Classification Search
CPC ............ H04W 24/10; H04W 72/1226; H04W 72/082; H04W 28/048; H04W 88/06;
(Continued)

(56) References Cited

U.S. PATENT DOCUMENTS 9,179,350 B2 * 11/2015 Yao ................ H04W 72/082
9,596,066 B2 * 3/2017 Ni ..................... H04L 5/0035
(Continued)

FOREIGN PATENT DOCUMENTS

CN       102595465 A       7/2012
CN       102684835 A       9/2012
(Continued)

OTHER PUBLICATIONS

International Search Report in the international application No. PCT/CN2017/106097, dated Jun. 28, 2018.
(Continued)

*Primary Examiner* — Man U Phan
(74) *Attorney, Agent, or Firm* — Ladas & Parry, LLP

(57) ABSTRACT

Provided are a data transmission method, a terminal device and a network device. The method is applicable to a terminal device, and the terminal device has a first channel used for receiving downlink data. The method comprises: a terminal device generates report information according to the self-interference condition of a first channel, the report information being used by a network device to determine scheduling information of the terminal device, and the self-interference condition referring to the interference on the first channel by channels of the terminal device other than the first channel; and the terminal device sends the report information to the network device. With the data transmission method according to the embodiments of the present invention, the terminal device sends the report information to the network device so that the network device may know whether a currently reported channel state information (CSI) measurement result has memory interference, thereby improving the accuracy of the scheduling information, and thus improving the user experience.

17 Claims, 2 Drawing Sheets

(58) Field of Classification Search
CPC .... H04W 72/12; H04W 72/08; H04L 5/0053; H04L 5/0062; H04L 1/00; H04L 5/00; H04L 5/0048; H04L 1/0026; H04L 1/0028; H04B 7/0626
USPC .......................................................... 370/329
See application file for complete search history.

(56) References Cited

U.S. PATENT DOCUMENTS

| | | | | |
|---|---|---|---|---|
| 9,838,193 | B2* | 12/2017 | Kazmi | H04W 24/08 |
| 10,034,283 | B2* | 7/2018 | Yerramalli | H04W 72/0446 |
| 10,122,480 | B2* | 11/2018 | Kim | H04L 5/001 |
| 10,834,622 | B2* | 11/2020 | Seo | H04B 17/24 |
| 2012/0207040 | A1 | 8/2012 | Comsa | |
| 2013/0322260 | A1 | 12/2013 | Yao | |
| 2014/0220963 | A1 | 8/2014 | Jung et al. | |
| 2014/0241250 | A1 | 8/2014 | Jung et al. | |
| 2014/0293895 | A1* | 10/2014 | Lin | H04L 5/0062 370/329 |
| 2015/0124726 | A1 | 5/2015 | Ni et al. | |
| 2017/0006492 | A1* | 1/2017 | Khoshnevisan | H04B 7/0626 |
| 2017/0367107 | A1 | 12/2017 | Comsa et al. | |
| 2021/0143883 | A1* | 5/2021 | Yerramalli | H04W 24/10 |
| 2021/0167829 | A1* | 6/2021 | Li | H04L 5/0048 |

FOREIGN PATENT DOCUMENTS

| | | |
|---|---|---|
| CN | 104080182 A | 10/2014 |
| CN | 105991244 A | 10/2016 |
| WO | 2012021879 A2 | 2/2012 |

OTHER PUBLICATIONS

Written Opinion of the International Searching Authority in the international application No. PCT/CN2017/106097, dated Jun. 22, 2018 with English translation provided by Google Translate.

LG Electronics Inc: "RLM and CQI for IDC UE", 3GPP Draft; R2-124032 RLM and CQI for IDC UE. 3rd Generation Partnership Project (3GPP), Mobile Competence Centre ; 650, Route Des Lucioles; F-06921 Sophia-Antipolis Cedex; France, vol. RAN WG2, No. Qingdao; Aug. 13, 2012-Aug. 17, 2012 Aug. 7, 2012 (Aug. 7, 2012), XP050665766, Retrieved from the Internet: URL: http://www.3gpp.org/ftp/tsg_ran/WG2_RL2/TSGR2_79/Docs/ [ retrieved on Aug. 7, 2012 ] * section 2 Discussion *.

Samsung: "Enhancements for Refined MDT Measurements", 3GPP Draft; R2-153445, 3rd Generation Partnership Project (3GPP), Mobile Competence Centre ; 650, Route Des Lucioles; F-06921 Sophia-Antipolis Cedex France, vol. RAN WG2, No. Beijing, P.R. China; Aug. 24, 2015-Aug. 28, 2015 Aug. 23, 2015 (Aug. 23, 2015), XP051004165, Retrieved from the Internet: URL: http://www.3gpp.org/ftp/Meetings_3GPP_SYNC/RAN2/Docs/ [ retrieved on Aug. 23, 2015 ] * p. 1, line 17-line 25 *.

Samsung et al: "Measurement for mobility purpose during in-device interference", 3GPP Draft; R2-120290, 3rd Generation Partnership Project (3GPP), Mobile Competence Centre ; 650, Route Des Lucioles; F-06921 Sophia-Antipolis Cedex France, vol. RAN WG2, No. Dresden, Germany; Feb. 6, 2012-Feb. 10, 2012, Jan. 30, 2012 (Jan. 30, 2012), XP050565127, [ retrieved on Jan. 30, 2012 ] * p. 1, line 18-line 20 *.

Nokia et al: "LAA/WiFi hardware sharing problem", 3GPP Draft; R4-1711371 LAA-WiFi Hardware Sharing Problem, 3rd Generation Partnership Project (3GPP), Mobile Competence Centre; 650, Route Des Lucioles; F-06921 Sophia-Antipolis Cedex France, vol. RAN WG4, No. Dubrovnik, Croatia Oct. 9, 2017-Oct. 13, 2017 Oct. 8, 2017 (Oct. 8, 2017), XP051346090, Retrieved from the Internet: URL: http://www.3gpp.org/ftp/Meetings_3GPP_SYNC/RAN4/Docs/ [ retrieved on Oct. 8, 2017 ] * section 2 Discussion *.

Supplementary European Search Report in the European application No. 17928721.4, dated Jun. 23, 2020.

Written Opinion of the International Search Authority in the international application No. PCT/CN2017/106097, dated Jun. 28, 2018.

Nokia, Alcatel-Lucent Shanghai Bell, Supporting 1Tx UE in EN-DC, Discussion and Decision, 3GPP TSG-RAN WG2 NR Adhoc #2 R2-1706596, Jun. 27-29, 2017.

* cited by examiner

DATA TRANSMISSION METHOD, TERMINAL DEVICE, AND NETWORK DEVICE

CROSS-REFERENCE TO RELATED APPLICATION

This application is the U.S. national phase of PCT/CN2017/106097, filed on Oct. 13, 2017, the disclosure of which is incorporated by reference herein in its entirety.

TECHNICAL FIELD

Embodiments of the disclosure relate to the field of communications, and more particularly to a method for data transmission, a terminal device and a network device.

BACKGROUND

With pursuit of people for rate, latency, high-speed mobility and energy efficiency and with diversity and complexity of services in the future life, the $3^{rd}$ Generation Partnership Project (3GPP) as the international standards organization has started the development of the $5^{th}$-Generation mobile communication technology (5G). The application scenarios of 5G include Enhance Mobile Broadband (eMBB), Ultra-Reliable and Low latency Communication (URLLC), and massive Machine Type Communication (mMTC).

In the related arts, for protecting early investments of mobile operators in Long Term Evolution (LTE), a working mode for tight interworking between LTE and New Radio (NR) is proposed. Specifically, band combination is used to support data transmission under LTE-NR Dual Connection (DC) to improve a system throughput.

However, when a terminal device simultaneously works on two or more carriers in different bands, Uplink (UL) signals on these carriers may interfere with Downlink (DL) received signals on some carriers. But scheduling information for data by a network device is based on measurement of a channel environment by the terminal device, that is, the scheduling information for the terminal device is determined based on Channel State Information (CSI) measurement reporting of the terminal device. At present, a CSI measurement result does not reflect an actual channel environment. Thus, the scheduling information determined by the network device may not be accurate, and a user experience is reduced.

For example, no internal interference is present during CSI measurement while internal interference is present during data reception, which results in a decoding failure.

SUMMARY

A method for data transmission, a terminal device and a network device are provided, which may effectively increase a success rate of data transmission.

In a first aspect, there is provided a method for data transmission, which may be applied to a terminal device, the terminal device has a first channel for receiving DL data.

The method may include the following operations.

The terminal device generates reporting information according to a self-interference situation of the first channel, here, the reporting information is used for a network device to determine scheduling information for the terminal device, and the self-interference situation includes: interference of a channel, except the first channel, of the terminal device with the first channel.

The terminal device transmits the reporting information to the network device.

According to the method for data transmission provided in the embodiments of the disclosure, the terminal device transmits the reporting information to the network device to enable the network device to know about whether a presently reported CSI measurement result is affected by the internal interference, so that accuracy of the scheduling information may be improved, and a user experience may further be improved.

In some possible implementation modes, the operation that the terminal device generates the reporting information according to the self-interference situation of the first channel may include the following operations.

The terminal device generates first CSI of the first channel.

The terminal device generates indication information according to the self-interference situation of the first channel, here, the indication information indicates whether self-interference is present on the first channel during the terminal device measures the first CSI.

The operation that the terminal device transmits the reporting information to the network device may include the following operation.

The terminal device transmits the indication information to the network device.

The method may further include the following operation.

The terminal device transmits the first CSI to the network device along with the reporting information.

In some possible implementation modes, the operation that the terminal device generates the reporting information according to the self-interference situation of the first channel may include the following operation.

The terminal device generates second CSI of the first channel and third CSI of the first channel according to the self-interference situation of the first channel, here, the second CSI is measured by the terminal device in a case that self-interference is present on the first channel, and the third CSI is measured by the terminal device in a case that no self-interference is present on the first channel.

The operation that the terminal device transmits the reporting information to the network device may include the following operation.

The terminal device transmits the second CSI and the third CSI to the network device.

In some possible implementation modes, the operation that the terminal device generates the reporting information according to the self-interference situation of the first channel may include the following operation.

The terminal device generates second CSI of the first channel according to the self-interference situation of the first channel, here, the second CSI is measured by the terminal device in a case that self-interference is present on the first channel.

The operation that the terminal device transmits the reporting information to the network device may include the following operation.

The terminal device transmits the second CSI to the network device.

In some possible implementation modes, the operation that the terminal device generates the reporting information according to the self-interference situation of the first channel may include the following operation.

The terminal device determines at least one Modulation and Coding Scheme (MCS) for the network device according to the self-interference situation of the first channel.

The operation that the terminal device transmits the reporting information to the network device may include the following operation.

The terminal device transmits the at least one MCS to the network device.

In some possible implementation modes, the terminal device may have a second channel for transmitting UL data, here, the reporting information may further include first information and first transmission power information, the first information may include: carrier frequency information and bandwidth information of the second channel in a case that the terminal device transmits the UL data on the second channel, and the first transmission power information may include: transmission power information of the second channel in a case that the terminal device transmits the UL data on the second channel.

In a second aspect, there is provided a method for data transmission, which may include the following operations.

A network device receives reporting information transmitted by a terminal device, here, the reporting information is determined by the terminal device according to a self-interference situation of a first channel, the first channel is used by the terminal device to receive DL data, and the self-interference situation includes: interference of a channel, except the first channel, of the terminal device with the first channel.

The network device determines scheduling information for the terminal device according to the reporting information.

In some possible implementation modes, the operation that the network device receives the reporting information transmitted by the terminal device may include the following operation.

The network device receives indication information transmitted by the terminal device, here, the indication information indicates whether self-interference is present on the first channel during the terminal device measures first CSI of the first channel.

The method may further include the following operation.

The terminal device transmits the first CSI to the network device along with the reporting information.

The operation that the network device determines the scheduling information for the terminal device according to the reporting information may include the following operation.

The network device determines the scheduling information for the terminal device according to the first CSI and the indication information.

In some possible implementation modes, the operation that the network device receives the reporting information transmitted by the terminal device may include the following operation.

The network device receives second CSI of the first channel and third CSI of the first channel from the terminal device, here, the second CSI is measured by the terminal device in a case that self-interference is present on the first channel and the third CSI is measured by the terminal device in a case that no self-interference is present on the first channel.

The operation that the network device determines the scheduling information for the terminal device according to the reporting information may include the following operation.

The network device determines the scheduling information for the terminal device according to the second CSI and the third CSI.

In some possible implementation modes, the operation that the network device receives the reporting information transmitted by the terminal device may include the following operation.

The network device receives second CSI of the first channel from the terminal device, here, the second CSI is measured by the terminal device in a case that self-interference is present on the first channel.

The operation that the network device determines the scheduling information for the terminal device according to the reporting information may include the following operation.

The network device determines the scheduling information for the terminal device according to the second CSI.

In some possible implementation modes, the operation that the network device receives the reporting information transmitted by the terminal device may include the following operation.

The network device receives at least one MCS for the network device from the terminal device.

The operation that the network device determines the scheduling information for the terminal device according to the reporting information may include the following operation.

The network device determines the scheduling information for the terminal device according to the at least one MCS.

In some possible implementation modes, the reporting information may further include first information and first transmission power information, here, the first information may include: carrier frequency information and bandwidth information of a second channel in a case that the terminal device transmits UL data on the second channel, and the first transmission power information may include: transmission power information of the second channel in a case that the terminal device transmits the UL data on the second channel.

In some possible implementation modes, the operation that the network device determines the scheduling information for the terminal device according to the reporting information may include the following operations.

The network device determines second information and second transmission power information according to the first information and the first transmission power information, here, the second information includes: carrier frequency information and bandwidth information of the second channel in a case that the terminal device receives the DL data on the first channel, and the second transmission power information includes: transmission power information of the second channel in a case that the terminal device receives the DL data on the first channel.

The network device determines the scheduling information according to the second information and the second transmission power information.

In a third aspect, there is provided a terminal device, which may have a first channel for receiving DL data and include a processing unit and a transceiver unit.

The processing unit may be configured to generate reporting information according to a self-interference situation of the first channel, here, the reporting information is used by a network device to determine scheduling information for the terminal device, and the self-interference situation includes: interference of a channel, except the first channel, of the terminal device with the first channel.

The transceiver unit may be configured to transmit the reporting information to the network device.

In a fourth aspect, there is provided a terminal device, which has a first channel for receiving DL data and includes a processor and a transceiver.

The processor is configured to generate reporting information according to a self-interference situation of the first channel, here, the reporting information is used by a network device to determine scheduling information for the terminal device, and the self-interference situation includes: interference of a channel, except the first channel, of the terminal device with the first channel.

The transceiver is configured to transmit the reporting information to the network device.

In a fifth aspect, there is provided a network device, which may include a transceiver unit and a processing unit.

The transceiver unit may be configured to receive reporting information transmitted by a terminal device, here, the reporting information is determined by the terminal device according to a self-interference situation of a first channel, the first channel is used by the terminal device to receive DL data, and the self-interference situation includes: interference of a channel, except the first channel, of the terminal device with the first channel.

The processing unit may be configured to determine scheduling information for the terminal device according to the reporting information.

In a sixth aspect, there is provided a network device, which includes a transceiver and a processor.

The transceiver is configured to receive reporting information transmitted by a terminal device, here, the reporting information is determined by the terminal device according to a self-interference situation of a first channel, the first channel is used by the terminal device to receive DL data, and the self-interference situation includes: interference of a channel, except the first channel, of the terminal device with the first channel.

The processor is configured to determine scheduling information for the terminal device according to the reporting information.

In a seventh aspect, there is provided a computer-readable medium, which is configured to store a computer program, the computer program includes an instruction configured to execute the method embodiment of the first aspect or the second aspect.

In an eighth aspect, there is provided a computer chip, which includes an input interface, an output interface, at least one processor and a memory. The processor is configured to execute a code in the memory. When the code is executed, the processor may implement each process executed by the terminal device in the method for data transmission in the first aspect and each implementation mode.

In a ninth aspect, there is provided a computer chip, which includes an input interface, an output interface, at least one processor and a memory. The processor is configured to execute a code in the memory. When the code is executed, the processor may implement each process executed by the network device in the method for data transmission in the second aspect and each implementation mode.

In a tenth aspect, there is provided a communication system, which includes the abovementioned network device and the abovementioned terminal device.

DETAILED DESCRIPTION

Figure 1:
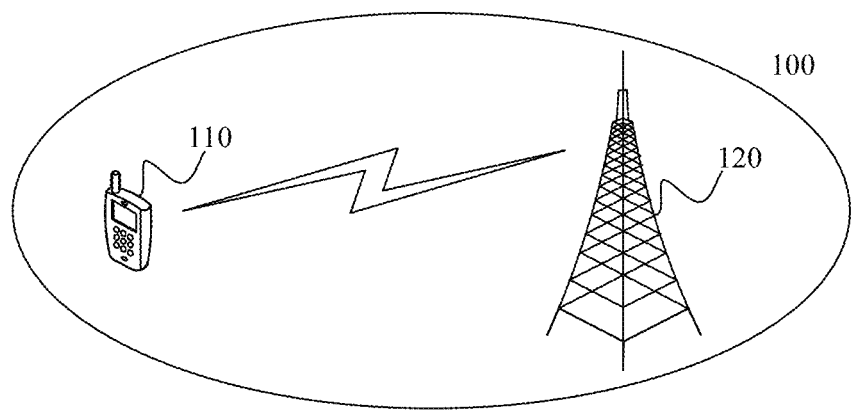
FIG. 1 is an example of a communication system according to embodiments of the disclosure.

FIG. 1 is a diagram of an application scenario according to embodiments of the disclosure.

As illustrated in FIG. 1, a communication system 100 may include a terminal device 110 and a network device 120. The network device 120 may communicate with the terminal device 110 through an air interface. Multi-service transmission is supported between the terminal device 110 and the network device 120.

The embodiments of the disclosure are described only with the communication system 100 as an example but the embodiments of the disclosure are not limited thereto. That is, the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, LTE Time Division Duplex (TDD) system, and a Universal Mobile Telecommunication System (UMTS).

In addition, each embodiment of the disclosure is described in combination with the network device and the terminal device.

The network device 120 may be any entity on a network side that is configured to transmit or receive a signal. For example, the network device may be Machine Type Communication (MTC) User Equipment (UE), a Base Transceiver Station (BTS) in the GSM or CDMA, a Node B in WCDMA, an Evolutional Node B (eNB or eNodeB) in LTE, or a base station device in a 5G network.

The terminal device 110 may be any terminal device. Specifically, the terminal device 110 may communicate with one or more Core Networks (CNs) through a Radio Access Network (RAN), may also be called an access terminal, UE, a user unit, a user station, a mobile station, a mobile radio station, a remote station, a remote terminal, a mobile device, a user terminal, a terminal, a wireless communication device, a user agent or a user device. For example, the terminal device may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, or a terminal device in the 5G network.

In a 5G communication system, during early deployment of NR, it is difficult to obtain complete NR coverage, so the typical network coverage includes a wide-area LTE coverage and NR island coverage mode. Moreover, since LTE is heavily deployed below 6 GHz, few spectrums below 6 GHz are available for 5G.

For solving the problem above, in the embodiments of the disclosure, band combination is used to support data transmission under the LTE-NR Dual Connection (DC) to improve a system throughput. However, when a terminal device simultaneously works on two or more carriers in different bands, UL signals on these carriers may interfere with DL received signals on some carriers, and thus a success rate of data transmission is reduced.

For example, if a carrier F1 works in a low band and a carrier F2 works in a high band, there may be three different types of mutual interference as follows.

The First Type of Mutual Interference

Both the carrier F1 and the carrier F2 are UL carriers, and a frequency of a certain-order Intermodulation (IM) signal on the carrier F1 and the carrier F2 overlaps or partially overlaps with a frequency of a DL signal on a carrier F3. In such case, the carriers F1 and F2 interfere with F3. Here, F3 may be one of the carriers F1 and F2, or may be another carrier different from F1 or F2 (in such case, the terminal may simultaneously work on more than two carriers). For example, the terminal device is configured with LTE carriers in band 1 and band 7 and configured with an NR carrier (3,400-3,800 MHz), and if UL transmission in the band 7 and UL transmission in the NR are performed simultaneously, then fifth-order IM effects generated by such simultaneous transmission may affect sensitivity of a DL receiver in the band 1.

The Second Type of Mutual Interference

The carrier F1 is a UL carrier, the carrier F2 is a DL carrier, and a multiple frequency of the carrier F1 overlaps or partially overlaps with a frequency of the carrier F2. In such case, the carrier F1 generates harmonic interference to the carrier F2. For example, a UL bandwidth of the LTE band 3 is 1,710-1,785 MHz, and a range of a second-order harmonic in the bandwidth is 3,420-3,570 MHz. If a terminal simultaneously performs LTE UL transmission in the band 3 and performs DL reception in the NR band 3,400-3,800 MHz, a second-order harmonic may interfere with sensitivity of an NR DL receiver.

The Third Type of Mutual Interference

The carrier F1 is a DL carrier, the carrier F2 is a UL carrier, and a multiple frequency of the carrier F1 overlaps or partially overlaps with a frequency of the carrier F2. In such case, the carrier F2 generates harmonic mixing interference to the carrier F1. For example, a DL bandwidth of the LTE band 3 is 1,805-1,880 MHz, and a range of a second-order harmonic in the DL bandwidth is 3,610-3,760 MHz. If a terminal simultaneously performs LTE DL reception in the band 3 and performs UL transmission in the NR band 3,400-3,800 MHz, a second-order harmonic mixing of NR may interfere with sensitivity of an LTE DL receiver.

However, scheduling information for data by the network device is based on measurement of a channel environment by the terminal device, that is, the scheduling information for the terminal device is determined based on CSI measurement reporting of the terminal device. During the terminal device measures CSI, if the terminal device has internal interference, a CSI measurement result may be affected by the internal interference. That is, the present CSI measurement result does not reflect an actual channel environment. Thus, the scheduling information determined by the network device may not be accurate, and a user experience is reduced.

For example, no internal interference is present during CSI measurement while internal interference is present during data reception, and thus a decoding failure may be caused.

Therefore, the embodiments of the disclosure provide a method for data transmission. A terminal device transmits reporting information to a network device to enable the network device to know about whether a presently reported CSI measurement result is affected by the internal interference, so that accuracy of scheduling information may be improved, and a user experience may further be improved.

Figure 2:
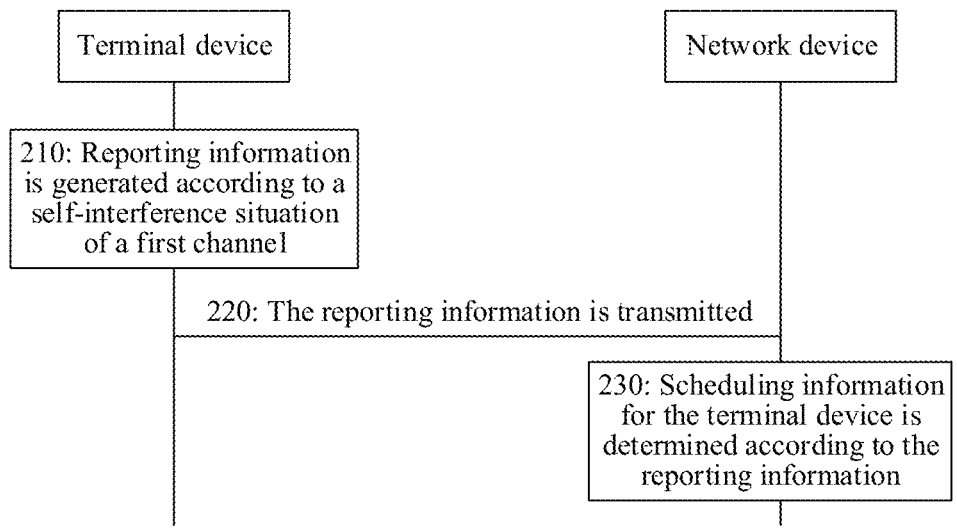
FIG. 2 is a flowchart of a method for data transmission according to embodiments of the disclosure.

FIG. 2 is a flowchart of a method for data transmission according to embodiments of the disclosure.

As illustrated in FIG. 2, the method includes the following operations.

In 210, a terminal device generates reporting information according to a self-interference situation of a first channel of the terminal device.

In 220, the terminal device transmits the reporting information to a network device.

In 230, the network device determines scheduling information for the terminal device according to the reporting information.

Specifically, the terminal device generates the reporting information according to the self-interference situation of the first channel, here, the reporting information is used for the network device to determine the scheduling information for the terminal device, the first channel is a channel of the terminal device for receiving DL data, and the self-interference situation includes: interference of a channel, except the first channel, of the terminal device with the first channel. The terminal device transmits the reporting information to the network device.

It is to be understood that the terminal device in the embodiments of the disclosure is a terminal device that may have self-interference. For example, the terminal device may receive on the first channel the DL data transmitted by the network device while transmitting UL data on a second channel. In such case, transmission of the UL data generates self-interference to reception of the DL data, and thus the demodulation performance of the DL data is reduced. In other words, mutual interference is present between the first channel and second channel of the terminal device. Or, self-interference is present on the first channel.

In the embodiments of the disclosure, the terminal device transmits the reporting information to the network device to enable the network device to know about whether a presently reported CSI measurement result is affected by the internal interference, thereby avoiding inaccuracy of the CSI measurement result reported to the network device by the terminal device. Therefore, accuracy of the scheduling information is improved, and a user experience is further improved.

Descriptions will be made below in combination with implementation modes of the operation that the terminal device generates the reporting information.

In an embodiment, the terminal device may generate indication information according to the self-interference situation of the first channel, here, the indication information indicates whether self-interference is present on the first channel during the terminal device measures first CSI; and the terminal device transmits the indication information to the network device, and transmits the first CSI to the network device along with the indication information. Therefore, the network device may accurately determine the scheduling information for the terminal device according to the first CSI and the indication information.

It is to be understood that the first CSI is transmitted along with the indication information may include that the indication information and the first CSI may be transmitted simultaneously or may be transmitted separately.

For example, the first CSI and the indication information may be carried in the same message for transmitting.

Specifically, since the terminal device knows about whether UL data is transmitted on an interfering side during CSI measurement, that is, the terminal device knows about the self-interference situation of the first channel, and thus the terminal device may add, when reporting CSI, the indication information into a measured CSI according to whether the internal interference is present during the measurement, here, the indication information indicates whether the self-interference is present on the first channel with the measured CSI.

In another embodiment, the terminal device may generate second CSI of the first channel and third CSI of the first channel according to the self-interference situation of the first channel, here, the second CSI is CSI measured by the terminal device in the case that self-interference is present on the first channel, and the third CSI is CSI measured by the terminal device in the case that no self-interference is present on the first channel. In other words, the terminal device transmits the second CSI and the third CSI to the network device. Therefore, the network device may accurately determine the scheduling information for the terminal device according to the second CSI and the third CSI.

In brief, two pieces of CSI are reported to the network device when reporting CSI, one is CSI with internal interference and the other is CSI without the internal interference.

In another embodiment, the terminal device may generate second CSI of the first channel according to the self-interference situation of the first channel, here, the second CSI is CSI measured by the terminal device in the case that self-interference is present on the first channel. In other words, the terminal device transmits the second CSI to the network device. Therefore, the network device may accurately determine the scheduling information for the terminal device according to the second CSI.

It is to be understood that in the embodiments of the disclosure, the terminal device may only report, when reporting CSI, the CSI with the internal interference, to instruct the network device to adopt a low-order MCS, thereby ensuring reliability of the data transmission.

In another embodiment, the terminal device determines at least one MCS available for the network device according to the self-interference situation of the first channel. In other words, the terminal device transmits the at least one MCS to the network device. Therefore, the network device may accurately determine the scheduling information for the terminal device according to the at least one MCS.

Specifically, the terminal device may determine the at least one MCS according to the self-interference situation of the first channel and correspondences between self-interference situations and MCSs. For example, the terminal determines, responsive to determining that the self-interference is present on the first channel, the at least one MCS, here, the at least one MCS includes a low-order MCS. For another example, the terminal device determines, responsive to determining that no self-interference is present on the first channel, the at least one MCS, here, the at least one MCS includes a high-order MCS.

In the embodiments of the disclosure, the operation that the network device determines the scheduling information based on the CSI reported by the terminal device is only the exemplary description of the implementation mode of the operation that the terminal device determines the scheduling information, and the embodiments of the disclosure are not limited thereto.

For example, the terminal device has a second channel for transmitting UL data, the reporting information further includes first information and first transmission power information, the first information includes: carrier frequency information and bandwidth information of the second channel in the case that the terminal device transmits the UL data on the second channel, and the first transmission power information includes: transmission power information of the second channel in the case that the terminal device transmits the UL data on the second channel.

Specifically, the network device may receive the reporting information to determine second information and second transmission power information according to the first information and the first transmission power information, here, the second information includes: carrier frequency information and bandwidth information of the second channel in the case that the terminal device receives the DL data on the first channel, and the second transmission power information includes: transmission power information of the second channel in the case that the terminal device receives the DL data on the first channel. The network device determines the scheduling information according to the second information and the second transmission power information.

In other words, the terminal device may report the first information and the first transmission power information of the second channel for transmitting the UL data during the CSI measurement while reporting the CSI. Therefore, the network device determines, when scheduling the terminal device to receive the DL data, scheduling information for subsequent DL data according to the CSI reported and according to the second information and second transmission power information which are estimated during reception of the DL data.

Figure 3:
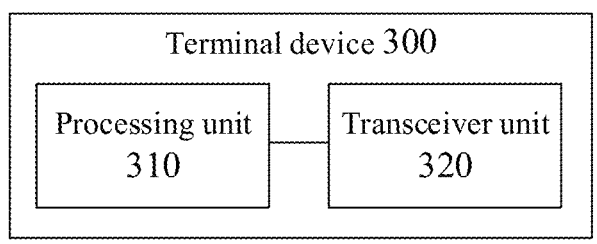
FIG. 3 is a block diagram of a terminal device according to embodiments of the disclosure.

FIG. 3 is a block diagram of a terminal device 300 according to embodiments of the disclosure. It is to be understood that the terminal device in the embodiments of the disclosure at least has a first channel for receiving DL data.

As illustrated in FIG. 3, the terminal device 300 includes a processing unit 310 and a transceiver unit 320.

The processing unit 310 is configured to generate reporting information according to a self-interference situation of the first channel, here, the reporting information is used for a network device to determine scheduling information for the terminal device, and the self-interference situation includes: an interference of a channel, except the first channel, of the terminal device with the first channel.

The transceiver unit 320 is configured to transmit the reporting information to the network device.

In an embodiment, the processing unit 310 is configured to: generate first CSI of the first channel; and generate indication information according to the self-interference situation of the first channel, here, the indication information indicates whether self-interference is present on the first channel during the terminal device measures the first CSI.

The transceiver unit 320 is configured to: transmit the first CSI and the reporting information to the network device, here, the reporting information includes the indication information.

In an embodiment, the processing unit 310 is configured to: generate second CSI of the first channel and third CSI of the first channel according to the self-interference situation of the first channel, here, the second CSI is measured by the terminal device in the case that self-interference is present on the first channel, and the third CSI is measured by the terminal device in the case that no self-interference is present on the first channel.

The transceiver unit 320 is configured to: transmit the second CSI and the third CSI to the network device.

In an embodiment, the processing unit 310 is configured to: generate second CSI of the first channel according to the self-interference situation of the first channel, here, the second CSI is measured by the terminal device in the case that self-interference is present on the first channel.

The transceiver unit 320 is configured to: transmit the second CSI to the network device.

In an embodiment, the processing unit 310 is configured to: determine at least one MCS for the network device according to the self-interference situation of the first channel.

The transceiver unit 320 is configured to: transmit the at least one MCS to the network device.

In an embodiment, the terminal device has a second channel for transmitting UL data, here, the reporting information further includes first information and first transmission power information, the first information includes: carrier frequency information and bandwidth information of the second channel in the case that the terminal device transmits the UL data on the second channel, and the first transmission power information includes: transmission power information of the second channel in the case that the terminal device transmits the UL data on the second channel.

In the embodiments of the disclosure, the processing unit 310 may be implemented by a processor and the transceiver unit 320 may be implemented by a transceiver.

Figure 4:
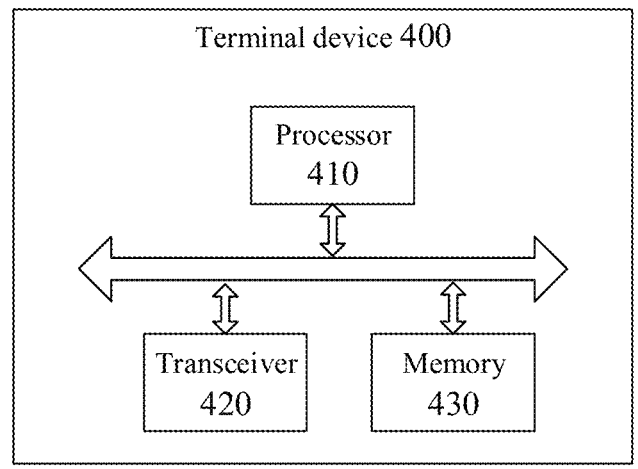
FIG. 4 is another block diagram of a terminal device according to embodiments of the disclosure.

As illustrated in FIG. 4, a terminal device 400 may include a processor 410, a transceiver 420 and a memory 430. The memory 430 may be configured to store indication information and may further be configured to store a code, instruction and the like executed by the processor 410. Each component in the terminal device 400 is connected through a bus system. The bus system includes a data bus, and further includes a power bus, a control bus and a state signal bus.

The terminal device 400 illustrated in FIG. 4 may implement each process implemented by the terminal device in the method embodiments of FIG. 2. For avoiding repetitions, elaborations are omitted herein.

Figure 5:
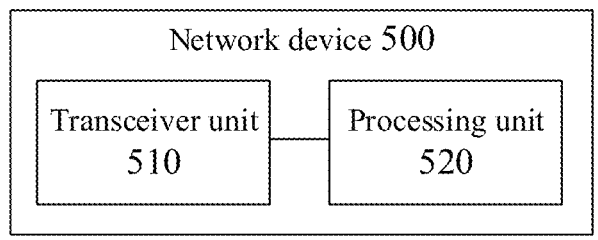
FIG. 5 is a block diagram of a network device according to embodiments of the disclosure.

FIG. 5 is a block diagram of a network device 500 according to embodiments of the disclosure.

As illustrated in FIG. 5, the network device 500 includes a transceiver unit 510 and a processing unit 520.

The transceiver unit 510 is configured to receive reporting information transmitted by a terminal device, here, the reporting information is determined by the terminal device according to a self-interference situation of a first channel, the first channel is used by the terminal device to receive DL data, and the self-interference situation includes: an interference of a channel, except the first channel, of the terminal device with the first channel.

The processing unit 520 is configured to determine scheduling information for the terminal device according to the reporting information.

In an embodiment, the transceiver unit 510 is configured to: receive first CSI and reporting information from the terminal device, here, the reporting information includes indication information, and the indication information indicates whether self-interference is present on the first channel during the terminal device measures the first CSI.

The processing unit 520 is configured to: determine the scheduling information for the terminal device according to the first CSI and the indication information.

In an embodiment, the transceiver unit 510 is configured to: receive second CSI of the first channel and third CSI of the first channel from the terminal device, here, the second CSI is measured by the terminal device in the case that self-interference is present on the first channel, and the third CSI is measured by the terminal device in the case that no self-interference is present on the first channel.

The processing unit 520 is configured to: determine the scheduling information for the terminal device according to the second CSI and the third CSI.

In an embodiment, the transceiver unit 510 is configured to: receive second CSI of the first channel from the terminal device, here, the second CSI is measured by the terminal device in the case that self-interference is present on the first channel.

The processing unit 520 is configured to: determine the scheduling information for the terminal device according to the second CSI.

In an embodiment, the transceiver unit 510 is configured to: receive at least one MCS for the network device from the terminal device.

The processing unit 520 is configured to: determine the scheduling information for the terminal device according to the at least one MCS.

In an embodiment, the reporting information further includes first information and first transmission power information, the first information includes: carrier frequency information and bandwidth information of a second channel in the case that the terminal device transmits UL data on the second channel, and the first transmission power information includes: transmission power information of the second channel in the case that the terminal device transmits the UL data on the second channel.

In an embodiment, the processing unit 520 is configured to: determine second information and second transmission power information according to the first information and the first transmission power information, here, the second information includes: carrier frequency information and bandwidth information of the second channel in the case that the terminal device receives the DL data on the first channel, and the second transmission power information includes: transmission power information of the second channel in the case that the terminal device receives the DL data on the first channel; and determine the scheduling information according to the second information and the second transmission power information.

In the embodiments of the disclosure, the transceiver unit 510 may be implemented by a transceiver and the processing unit 520 may be implemented by a processor.

Figure 6:
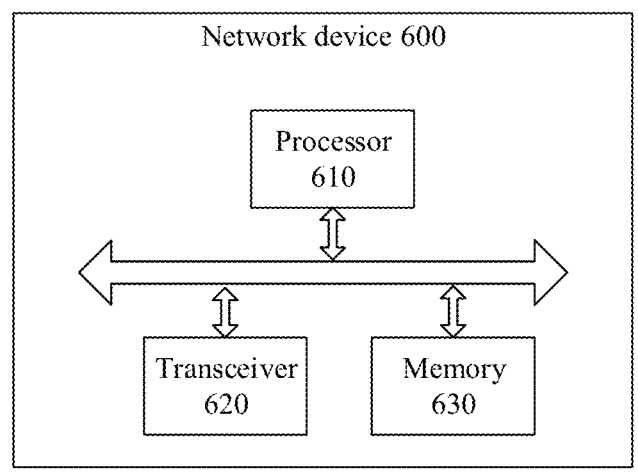
FIG. 6 is another block diagram of a network device according to embodiments of the disclosure.

As illustrated in FIG. 6, a network device 600 may include a processor 610, a transceiver 620 and a memory 630. The memory 630 may be configured to store indication information and may further be configured to store a code, instruction and the like executed by the processor 610. Each component in the network device 600 is connected through a bus system. The bus system includes a data bus, and further includes a power bus, a control bus and a state signal bus.

The network device 600 illustrated in FIG. 6 may implement each process implemented by the network device in the method embodiments of FIG. 2. For avoiding repetitions, elaborations are omitted herein. That is, the method embodiments in the embodiments of the disclosure may be applied to a processor or performed by the processor.

In an implementation process, each operation of the method embodiments in the embodiments of the disclosure may be completed by an integrated logical circuit of hardware in the processor or an instruction in a software form. More specifically, the operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in the field, such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory and completes the operations of the methods in combination with hardware.

The processor may be an integrated circuit chip with a signal processing capability and may implement or execute each method, operation and logical block diagram disclosed in the embodiments of the disclosure. For example, the processor may be a universal processor, a Digital Signal Processor (DSP), an Application Specific Integrated Circuit (ASIC), a Field Programmable Gate Array (FPGA) or another programmable logical device, a transistor logical device and a discrete hardware component. In addition, the universal processor may be a microprocessor or the processor may be any conventional processor and the like.

Moreover, the memory in the embodiments of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is to be understood that the memory is exemplarily but unlimitedly described. For example, the memory in the embodiments of the disclosure may also be a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). That is, the memory of a system and method described in the disclosure is intended to include, but not limited to, these memories and any other proper types of memories.

The terms used in the embodiments and appended claims of the disclosure are only for the purpose of describing the specific embodiments and not intended to limit the embodiments of the disclosure.

For example, singular forms "a/an", "said" and "the" used in the embodiments and appended claims of the disclosure are also intended to include plural forms unless other meanings are clearly expressed in the context.

For another example, terms "first terminal device" and "second terminal device" may be adopted in the embodiments of the disclosure, but these terminal devices should not be limited to these terms. The terms are only adopted to distinguish various types of cell groups.

For another example, based on the context, term "in a case that/in the case that" used herein may be explained as "if" or "in case of" or "when" or "responsive to determining" or "responsive to detecting". Similarly, based on the context, phrase "if determining" may be explained as "when determining" or "responsive to determining"; phrase "if detecting (stated condition or event)" may be explained as "when detecting (stated condition or event)" or "responsive to detecting (stated condition or event)".

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the embodiments of the disclosure.

Those skilled in the art may clearly learn about that specific working process of the system, device and unit described above may refer to the corresponding process in the method embodiments and will not be elaborated herein for convenient and brief description.

In some embodiments provided by the disclosure, it is to be understood that the disclosed system, device and method may be implemented in another manner. For example, the device embodiments described above are only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection of the devices or the units through some interfaces, and may be electrical and mechanical or adopt other forms.

The units described as separate parts may or may not be physically separated, and parts displayed as units may or may not be physical units, and namely may be located in the same place, or may be distributed to multiple network units. Part or all of the units may be selected to achieve the purpose of the embodiments of the disclosure according to a practical requirement.

In addition, each function unit in the embodiments of the disclosure may be integrated into a processing unit, or each unit may exist independently, or two or more than two units may be integrated into a unit.

When being realized in form of software functional unit and sold or used as an independent product, the function may also be stored in a computer-readable storage medium. Based on such an understanding, the technical solutions of the embodiments of the disclosure substantially or parts making contributions to the related arts or part of the technical solutions may be embodied in form of software product, and the computer software product is stored in a storage medium, and includes a plurality of instructions configured to enable a computer device (which may be a personal computer, a server, a network device or the like) to execute all or part of the operations of the methods in the embodiments of the disclosure. The abovementioned storage medium includes: various media capable of storing program codes, such as a U disk, a mobile hard disk, a ROM, a RAM, a magnetic disk or an optical disk.

The above is only the specific implementation mode of the embodiments of the disclosure and not intended to limit the scope of protection of the embodiments of the disclosure. Any variations or replacements apparent to those skilled in the art within the technical scope disclosed by the embodiments of the disclosure shall fall within the scope of protection of the embodiments of the disclosure. Therefore, the scope of protection of the embodiments of the disclosure shall be subject to the scope of protection of the claims.

What is claimed is:

1. A method for data transmission, applied to a terminal device, wherein the terminal device has a first channel for receiving Downlink (DL) data and a second channel for transmitting Uplink (UL) data, and the method comprises:
generating, by the terminal device, reporting information according to a self-interference situation of the first channel, wherein the reporting information is used by a network device to determine scheduling information for the terminal device, and the self-interference situation comprises: interference of the second channel of the terminal device with the first channel; and transmitting, by the terminal device, the reporting information to the network device, wherein the reporting information comprises first information and first transmission power information, the first information comprises: carrier frequency information and bandwidth information of the second channel in a case that the terminal device transmits the UL data on the second channel, and the first transmission power information comprises: transmission power information of the second channel in a case that the terminal device transmits the UL data on the second channel.

2. The method of claim 1, wherein generating, by the terminal device, the reporting information according to the self-interference situation of the first channel comprises:

generating, by the terminal device, first Channel State Information (CSI) of the first channel, and generating, by the terminal device, indication information according to the self-interference situation of the first channel, wherein the indication information indicates whether self-interference is present on the first channel during the terminal device measures the first CSI;

transmitting, by the terminal device, the reporting information to the network device comprises:

transmitting, by the terminal device, the indication information to the network device; and the method further comprises:

transmitting, by the terminal device, to the network device the first CSI along with the reporting information.

3. The method of claim 1, wherein generating, by the terminal device, the reporting information according to the self-interference situation of the first channel comprises:

generating, by the terminal device, second CSI of the first channel and third CSI of the first channel according to the self-interference situation of the first channel, wherein the second CSI is measured by the terminal device in a case that self-interference is present on the first channel and the third CSI is measured by the terminal device in a case that no self-interference is present on the first channel; and transmitting, by the terminal device, the reporting information to the network device comprises:

transmitting, by the terminal device, the second CSI and the third CSI to the network device.

4. The method of claim 1, wherein generating, by the terminal device, the reporting information according to the self-interference situation of the first channel comprises:

generating, by the terminal device, second CSI of the first channel according to the self-interference situation of the first channel, wherein the second CSI is measured by the terminal device in a case that self-interference is present on the first channel; and transmitting, by the terminal device, the reporting information to the network device comprises:

transmitting, by the terminal device, the second CSI to the network device.

5. The method of claim 1, wherein generating, by the terminal device, the reporting information according to the self-interference situation of the first channel comprises:

determining, by the terminal device, at least one Modulation and Coding Scheme (MCS) for the network device according to the self-interference situation of the first channel; and transmitting, by the terminal device, the reporting information to the network device comprises:

transmitting, by the terminal device, the at least one MCS to the network device.

6. A terminal device, wherein the terminal device has a first channel for receiving Downlink (DL) data and a second channel for transmitting Uplink (UL) data, and the terminal device comprises:

a processor;

a transceiver; and a memory storing one or more instructions that, when executed by the processor, causes the processor to:

generate reporting information according to a self-interference situation of the first channel, wherein the reporting information is used by a network device to determine scheduling information for the terminal device, and the self-interference situation comprises: interference of the second channel of the terminal device with the first channel; and transmit, through the transceiver the reporting information to the network device, wherein the reporting information comprises first information and first transmission power information, the first information comprises: carrier frequency information and bandwidth information of the second channel in a case that the terminal device transmits the UL data on the second channel, and the first transmission power information comprises: transmission power information of the second channel in a case that the terminal device transmits the UL data on the second channel.

7. The terminal device of claim 6, wherein the one or more instructions cause the processor to:

generate first Channel State Information (CSI) of the first channel;

generate indication information according to the self-interference situation of the first channel, here, the indication information indicates whether self-interference is present on the first channel during the terminal device measures the first CSI;

transmit, through the transceiver, the indication information to the network device; and transmit, through the transceiver, to the network device the first CSI along with the reporting information.

8. The terminal device of claim 6, wherein the one or more instructions cause the processor to:

generate second CSI of the first channel and third CSI of the first channel according to the self-interference situation of the first channel, wherein the second CSI is measured by the terminal device in a case that self-interference is present on the first channel and the third CSI is measured by the terminal device in a case that no self-interference is present on the first channel; and transmit, through the transceiver, the second CSI and the third CSI to the network device.

9. The terminal device of claim 6, wherein the one or more instructions cause the processor to:

generate second CSI of the first channel according to the self-interference situation of the first channel, wherein the second CSI is measured by the terminal device in a case that self-interference is present on the first channel; and transmit, through the transceiver, the second CSI to the network device.

10. The terminal device of claim 6, wherein the one or more instructions cause the processor to:

determine at least one Modulation and Coding Scheme (MCS) for the network device according to the self-interference situation of the first channel; and transmit, through the transceiver, the at least one MCS to the network device.

11. A network device for data transmission, comprising:
a processor;
a transceiver; and
a memory storing one or more instructions that, when executed by the processor, causes the processor to:
receive, through the transceiver, reporting information transmitted by a terminal device, wherein the reporting information is determined by the terminal device according to a self-interference situation of a first channel, the first channel is used by the terminal device to receive Downlink (DL) data, and the self-interference situation comprises: interference of a second channel, for transmitting Uplink (UL) data, of the terminal device with the first channel; and
determine scheduling information for the terminal device according to the reporting information,
wherein the reporting information further comprises first information and first transmission power information, the first information comprises: carrier frequency information and bandwidth information of the second channel in a case that the terminal device transmits the UL data on the second channel, and the first transmission power information comprises: transmission power information of the second channel in a case that the terminal device transmits the UL data on the second channel.

12. The network device of claim 11, wherein the one or more instructions cause the processors to:
receive, through the transceiver, indication information transmitted by the terminal device, wherein the indication information indicates whether self-interference is present on the first channel during the terminal device measures first Channel State Information (CSI) of the first channel; and receive, from the terminal device, the first CSI along with the reporting information; and
determine the scheduling information for the terminal device according to the first CSI and the indication information.

13. The network device of claim 11, wherein the one or more instructions cause the processor to:
receive, through the transceiver, second CSI of the first channel and third CSI of the first channel from the terminal device, wherein the second CSI is measured by the terminal device in a case that self-interference is present on the first channel and the third CSI is measured by the terminal device in a case that no self-interference is present on the first channel; and
determine the scheduling information for the terminal device according to the second CSI and the third CSI.

14. The network device of claim 11, wherein the one or more instructions cause the processor to:
receive, through the transceiver, second CSI of the first channel from the terminal device, wherein the second CSI is measured by the terminal device in a case that self-interference is present on the first channel; and
determine the scheduling information for the terminal device according to the second CSI.

15. The network device of claim 11, wherein the one or more instructions cause the processor to:
receive, through the transceiver, at least one Modulation and Coding Scheme (MCS) for the network device from the terminal device; and
determine the scheduling information for the terminal device according to the at least one MCS.

16. The network device of claim 11, wherein the one or more instructions cause the processor is configured to:
determine second information and second transmission power information according to the first information and the first transmission power information, wherein the second information comprises: carrier frequency information and bandwidth information of the second channel in a case that the terminal device receives the DL data on the first channel, and the second transmission power information comprises: transmission power information of the second channel in a case that the terminal device receives the DL data on the first channel; and
determine the scheduling information according to the second information and the second transmission power information.

17. The terminal device of claim 10, wherein the one or more instructions cause the processor to:
determine, in a case that self-interference is present on the first channel, that the at least one MCS comprises a low-order MCS;
determine, in a case that no self-interference is present on the first channel, that the at least one MCS comprises a high-order MCS.

* * * * *